United States Patent
Han et al.

(10) Patent No.: US 10,057,740 B2
(45) Date of Patent: Aug. 21, 2018

(54) METHODS AND DEVICES FOR PROCESSING MOBILE TERMINAL RESOURCE

(71) Applicant: Xiaomi Inc., Beijing (CN)

(72) Inventors: Mengmeng Han, Beijing (CN); Peng Sun, Beijing (CN)

(73) Assignee: Xiaomi Inc., Beijing (CN)

( * ) Notice: Subject to any disclaimer, the term of this patent is extended or adjusted under 35 U.S.C. 154(b) by 643 days.

(21) Appl. No.: 14/461,512

(22) Filed: Aug. 18, 2014

(65) Prior Publication Data

US 2015/0120866 A1    Apr. 30, 2015

Related U.S. Application Data

(63) Continuation of application No. PCT/CN2014/077097, filed on May 9, 2014.

(30) Foreign Application Priority Data

Oct. 31, 2013  (CN) .......................... 2013 1 0530384

(51) Int. Cl.
*H04W 4/50* (2018.01)
*G06F 11/30* (2006.01)
(Continued)

(52) U.S. Cl.
CPC ........... *H04W 4/50* (2018.02); *G06F 11/3051* (2013.01); *H04W 4/001* (2013.01); *H04L 67/00* (2013.01); *H04L 67/04* (2013.01)

(58) Field of Classification Search
CPC ...... G06F 21/50; G06F 21/51; G06F 11/3051; H04L 67/04; H04L 67/00; H04W 4/50
See application file for complete search history.

(56) References Cited

U.S. PATENT DOCUMENTS 7,068,158 B2    6/2006 Komatsu et al.
9,268,958 B1 *  2/2016 Kessler ................... G06F 21/62
(Continued)

FOREIGN PATENT DOCUMENTS

CN     101636716 A    1/2010
CN     101753672 A    6/2010
(Continued)

OTHER PUBLICATIONS

International PCT Search Report for Application No. PCT/CN2014/077097, from the State Intellectual Property Office of China, dated Aug. 22, 2014.

(Continued)

*Primary Examiner* — Jeong S Park
(74) *Attorney, Agent, or Firm* — Finnegan, Henderson, Farabow, Garrett & Dunner LLP

(57) ABSTRACT

A method for processing a resource for use in a client computer, includes: sending, to a server, a request for processing the resource based on a user instruction, the request for processing the resource including an identification (ID) of the resource and a processing manner of the resource; receiving, from the server, a storage address of the resource and a first instruction, the first instruction including an ID of an interface of a mobile terminal application, and being configured to instruct a mobile terminal to call the interface of the mobile terminal application to process the resource; and downloading the resource from the storage address of the resource, and sending the downloaded resource and the first instruction to the mobile terminal, to enable the mobile terminal to call the interface of the mobile terminal application to process the resource.

10 Claims, 11 Drawing Sheets

(51) Int. Cl.
*H04W 4/00* (2018.01)
*H04L 29/08* (2006.01)

(56) References Cited

U.S. PATENT DOCUMENTS

| | | | |
|---|---|---|---|
| 2006/0212537 A1* | 9/2006 | Hans | G06F 8/61 |
| | | | 709/217 |
| 2008/0214172 A1* | 9/2008 | Anwer | G06F 8/65 |
| | | | 455/419 |
| 2008/0255692 A1 | 10/2008 | Hofrichter et al. | |
| 2009/0254993 A1* | 10/2009 | Leone | G06F 21/51 |
| | | | 726/25 |
| 2010/0026609 A1 | 2/2010 | Otsuki et al. | |
| 2011/0113353 A1* | 5/2011 | Koh | G06F 3/0488 |
| | | | 715/760 |
| 2011/0202914 A1 | 8/2011 | Kim et al. | |
| 2012/0131570 A1 | 5/2012 | Kaikkonen et al. | |
| 2012/0137270 A1 | 5/2012 | Ortiz | |
| 2012/0159388 A1 | 6/2012 | Chalouhi et al. | |
| 2013/0144974 A1 | 6/2013 | Haakenson et al. | |

FOREIGN PATENT DOCUMENTS

| | | |
|---|---|---|
| CN | 101895872 A | 11/2010 |
| CN | 101901146 A | 12/2010 |
| CN | 102752457 A | 10/2012 |
| CN | 103108032 A | 5/2013 |
| CN | 203135933 U | 8/2013 |
| CN | 103312746 A | 9/2013 |
| CN | 103338254 A | 10/2013 |
| CN | 103607431 A | 2/2014 |
| EP | 1703382 A1 | 9/2006 |
| EP | 1 950 656 A1 | 7/2008 |
| JP | 2000322359 A | 11/2000 |
| JP | 2010541043 A | 12/2010 |
| JP | 2012064014 A | 3/2012 |
| KR | 20130108621 A | 10/2013 |
| RU | 2458477 C2 | 8/2012 |
| WO | WO 2012066516 A1 | 5/2012 |

OTHER PUBLICATIONS

English version of International Search Report of PCT/CN2014/077097, from the State Intellectual Property Office of China dated Aug. 22, 2014.

European Search Report for Application No. 14180110.0-1870, from the European Patent Office, dated Dec. 15, 2014.

Office Action dated Jun. 29, 2018, in counterpart Indian Application No. 1533/KOLNP/2015.

* cited by examiner

METHODS AND DEVICES FOR PROCESSING MOBILE TERMINAL RESOURCE

CROSS REFERENCE TO RELATED APPLICATION

The present application is a Continuation of International Application No. PCT/CN2014/077097, filed May 9, 2014, which claims priority to Chinese Patent Application No. 201310530384.3, filed Oct. 31, 2013, the entire contents of all of which are incorporated herein by reference.

TECHNICAL FIELD

The present disclosure generally relates to the field of communication and, more particularly, to methods and devices for processing a mobile terminal resource.

BACKGROUND

A cell phone may be used to download different sorts of resources from a cellular network, such as a global system of mobile communication (GSM) network or a code division multiple access (CDMA) network. The resources may be pictures, application software, music, videos, etc. Generally, a user of the cell phone is charged based on a cellular data usage when downloading the resources using the cellular network.

Conventionally, to save expenditure on the cellular data usage, the user may download the resource to a personal computer (PC), and then transfer the downloaded resource from the PC to the cell phone using a wireless fidelity (WiFi) network. After receiving the resource, the user generally needs to manually set the cell phone to make use of the resource. For example, after receiving a picture from the PC, the cell phone may prompt the user to input an operation instruction of setting the picture as a wallpaper according to the prompt. Then the cell phone performs the operation instruction to finish the setting of the wallpaper. The process from downloading the resource to making use of the resource involves a number of manual operation steps, which is time-consuming for the user.

SUMMARY

According to a first aspect of the present disclosure, there is provided a method for processing a resource for use in a client computer, comprising: sending, to a server, a request for processing the resource based on a user instruction, the request for processing the resource including an identification (ID) of the resource and a processing manner of the resource; receiving, from the server, a storage address of the resource and a first instruction, the first instruction including an ID of an interface of a mobile terminal application, and being configured to instruct a mobile terminal to call the interface of the mobile terminal application to process the resource; and downloading the resource from the storage address of the resource, and sending the downloaded resource and the first instruction to the mobile terminal, to enable the mobile terminal to call the interface of the mobile terminal application to process the resource.

According to a second aspect of the present disclosure, there is provided a method for processing a resource for use in a mobile terminal, comprising: receiving, from a client computer, the resource and a first instruction, the first instruction including an identification (ID) of an interface of a mobile terminal application, and being configured to instruct the mobile terminal to call the interface of the mobile terminal application to process the resource; and calling the interface of the mobile terminal application to process the resource by following the first instruction.

According to a third aspect of the present disclosure, there is provided a client computer, comprising: a processor; and a memory for storing instructions executable by the processor; wherein the processor is configured to: send, to a server, a request for processing a resource based on a user instruction, the request for processing the resource including an identification (ID) of the resource and a processing manner of the resource; receive, from the server, a storage address of the resource and a first instruction, the first instruction including an ID of an interface of a mobile terminal application, and being configured to instruct a mobile terminal to call the interface of the mobile terminal application to process the resource; and download the resource from the storage address of the resource, and send the downloaded resource and the first instruction to the mobile terminal, wherein the downloaded resource and the first instruction configure the mobile terminal to call the interface of the mobile terminal application to process the resource.

According to a fourth aspect of the present disclosure, there is provided a mobile terminal, comprising: a processor; and a memory for storing instructions executable by the processor; wherein the processor is configured to: receive, from a client computer, a resource and a first instruction, the first instruction including an identification (ID) of an interface of a mobile terminal application, and being configured to instruct the mobile terminal to call the interface of the mobile terminal application to process the resource; and call the interface of the mobile terminal application to process the resource by following the first instruction.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
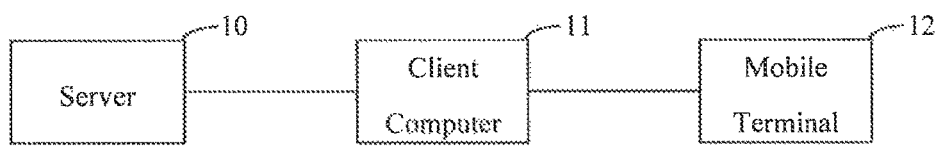
FIG. 1 is a block diagram of a system for processing a mobile terminal resource, according to an exemplary embodiment.

FIG. 1 is a block of a system 100 for processing a mobile terminal resource, according to an exemplary embodiment. Referring to FIG. 1, the system 100 includes a server 10, a client computer 11 connected to the server 10, and a mobile terminal 12 connected to the client computer 11. The server 10 stores all sorts of mobile terminal resources, such as pictures, videos, e-books, music and application programs, etc. The client computer 11 can be any computer on a user side. The client computer 11 and the server 10 constitute a computer network, which provides access to the mobile terminal resources stored in the server 10 and allows the mobile terminal resources to be downloaded therefrom. The mobile terminal 12 may establish a connection with the client computer 11 through a universal serial bus (USB) or Wi-Fi. Besides providing downloaded mobile terminal resources to the mobile terminal 12, the client computer 11 may also perform a management of the mobile terminal 12, such as performing a comprehensive management to system files, short messages, or contacts of the mobile terminal 12, and backing up and restoring important data in the mobile terminal 12 at any time. The client computer 11 may be a desktop computer, a notebook computer, etc., and the mobile terminal 12 may be a mobile phone, a tablet computer, etc.

In the embodiments of the present disclosure, mobile terminal resources may be the resources which can be provided via the computer network and then be processed by a mobile terminal application (APP), including, but not limited to, pictures, videos, e-books, music, and application programs, etc., and the processing of resources includes, but is not limited to, setting a picture as a wallpaper, playing a video, browsing an E-book, setting a piece of music as a ringtone, and installing an application program, etc. The mobile terminal APP may be any sort of application software supported on a corresponding operation system of the mobile terminal 12, including, but not limited to an APP for setting a picture as a wallpaper, an APP for playing a video, an APP for browsing an E-book, an APP for setting a piece of music as ringtone, or an APP for installing an application program.

Figure 2:
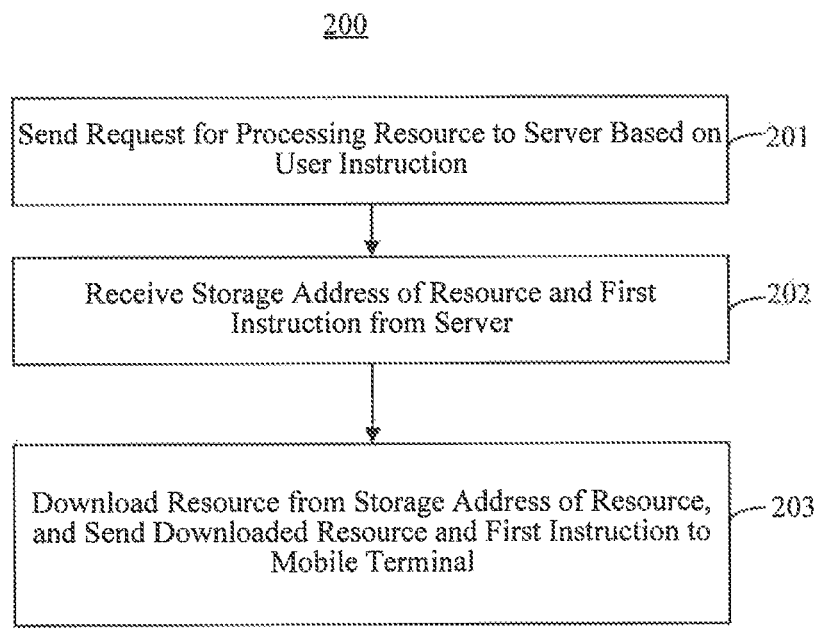
FIGS. 2-4 are each a flowchart of a method for processing a mobile terminal resource, according to exemplary embodiments.

FIG. 2 is flowchart of a method 200 for processing a resource, such as a mobile terminal resource, according to an exemplary embodiment. For example, the method 200 may be implemented by a client computer, such as the client computer 11 (FIG. 1). Referring to FIG. 2, the method 200 includes the following steps.

In step 201, the client computer sends a request for processing a resource to a server based on a user instruction. For example, the request for processing the resource includes an identification (ID) of the resource and a processing manner of the resource.

In step 202, the client computer receives a storage address of the resource and a first instruction from the server. For example, the first instruction includes an ID of an interface, such as an application program interface (API), of a mobile terminal APP to process the resource, and is used for instructing a mobile terminal to call the interface of the mobile terminal APP to process the resource.

In step 203, the client computer downloads the resource from the storage address of the resource, and sends the downloaded resource and the first instruction to the mobile terminal, so as to enable the mobile terminal to call the interface of the mobile terminal APP to process the resource.

After receiving the resource and the first instruction, the mobile terminal may, by following the first instruction, automatically call the interface corresponding to the ID of the interface of the mobile terminal APP to process the resource so as to implement the use of the resource. This can simplify operation steps involved from downloading of a mobile terminal resource to make use of the mobile terminal resource, thereby saving time for user.

Figure 3:
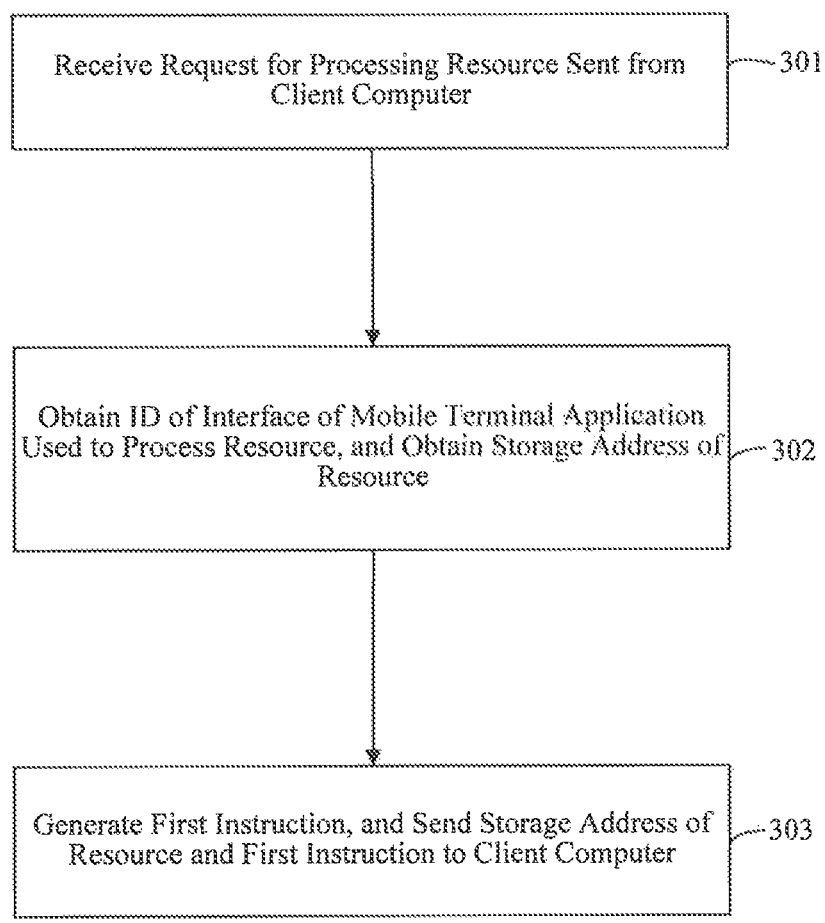

FIG. 3 is a flowchart of a method 300 for processing a resource, such as a mobile terminal resource, according to an exemplary embodiment. For example, the method 300 may be implemented by a server, such as the server 10 (FIG. 1). Referring to FIG. 3, the method 300 includes the following steps.

In step 301, the server receives a request for processing a resource sent from a client computer. For example, the request for processing the resource includes an ID of the resource and a processing manner of the resource.

In step 302, the server obtains, from a preset corresponding relationship between IDs of interfaces of mobile terminal APPs and processing manners of resources, an ID of an interface, such as an application program interface (API), of a mobile terminal APP used to process the resource corresponding to the processing manner of the resource, and obtains, from a preset corresponding relationship between IDs of resources and storage addresses, a storage address of the resource corresponding to the ID of the resource contained in the request for processing the resource.

In step 303, the server generates a first instruction and sends the obtained storage address of the resource and the first instruction to the client computer. For example, the first instruction includes the ID of the interface of the mobile terminal APP used to process the resource, and is used for instructing a mobile terminal to call the interface of the mobile terminal APP to process the resource.

After receiving the resource and the first instruction, the mobile terminal may, by following the first instruction, automatically call the interface corresponding to the ID of the interface of the mobile terminal APP to process the resource so as to implement the use of the resource. This can simplify operation steps involved from downloading of a mobile terminal resource to make use of the mobile terminal resource, thereby saving time for user.

Figure 4:
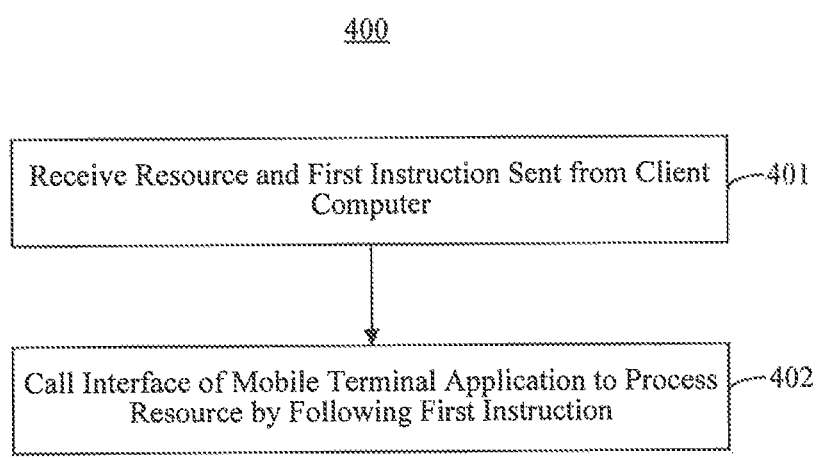

FIG. 4 is a flowchart of a method 400 for processing a resource, such as a mobile terminal resource, according to an exemplary embodiment. For example, the method 400 may be implemented by a mobile terminal, such as the mobile terminal 12 (FIG. 1). Referring to FIG. 4, the method 400 includes the following steps.

In step 401, the mobile terminal receives a resource and a first instruction sent from a client computer. For example, the first instruction includes an ID of an interface, such as an application program interface (API), of a mobile terminal APP used to process the resource, and is used for instructing the mobile terminal to call the interface of the mobile terminal APP to process the resource.

In step 402, the mobile terminal calls the interface of the mobile terminal APP to process the resource by following the first instruction.

The above embodiment may include receiving a storage address of the resource and a first instruction from a server by a client computer, downloading the resource from the storage address by the client computer, and sending the downloaded resource and the first instruction from the client computer to the mobile terminal. After receiving the resource and the first instruction, the mobile terminal may, by following the first instruction, automatically call the interface corresponding to the ID of the interface of the mobile terminal APP to process the resource so as to implement the use of the resource. This can simplify operation steps involved from downloading of a mobile terminal resource to make use of the mobile terminal resource, thereby saving time for user.

Figure 5:
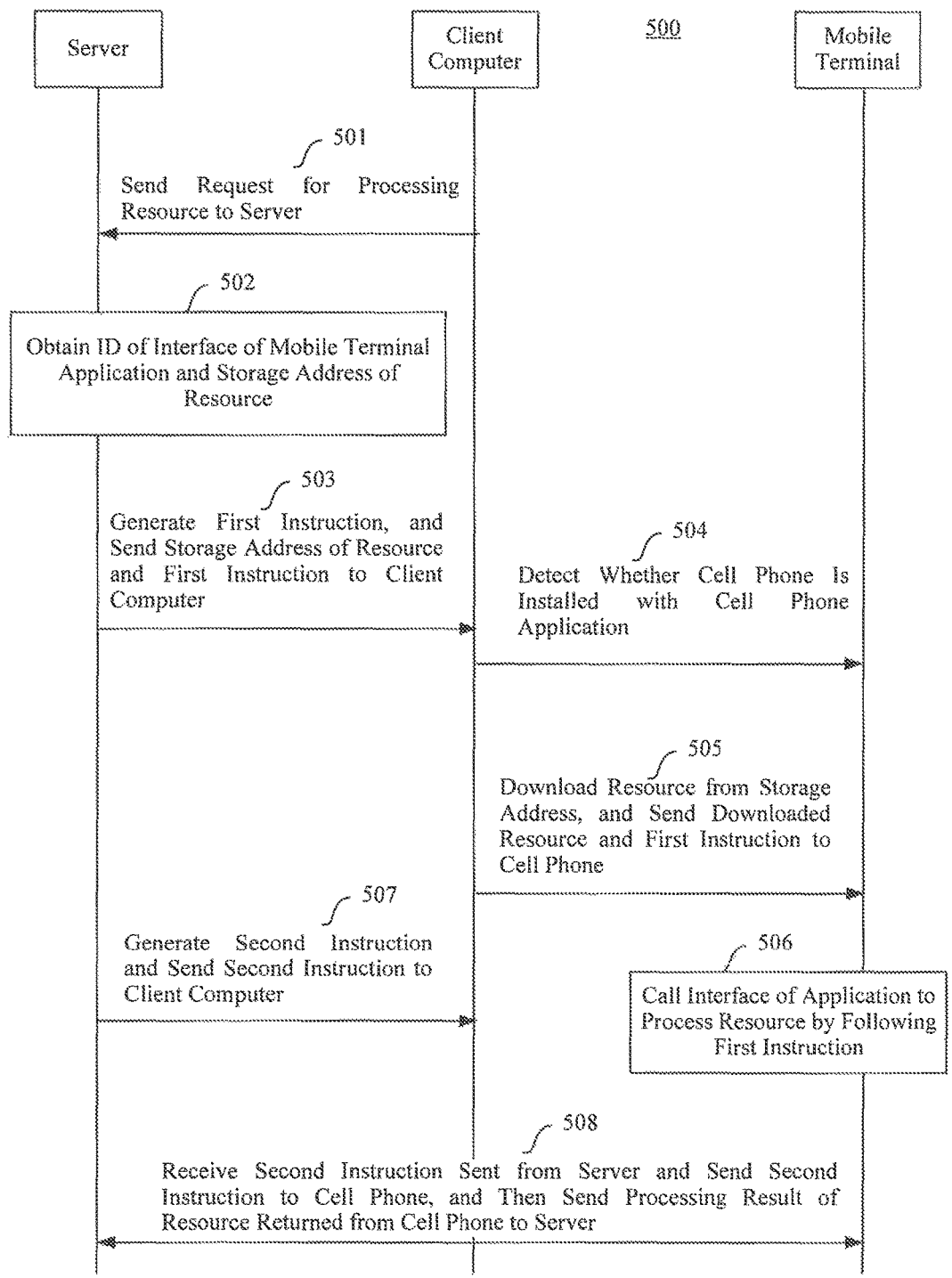
FIG. 5 is a diagram of a method for processing a mobile terminal resource, according to an exemplary embodiment.

FIG. 5 is diagram of a method 500 for processing a mobile terminal resource, according to an exemplary embodiment. In this embodiment, the method 500 is described in detail with a cell phone as an example of the mobile terminal. Referring to FIG. 5, the method 500 may include the following steps.

In step 501, a client computer sends a request for processing a resource to a server based on a user instruction. For example, the request for processing the resource includes an ID of the resource and a processing manner of the resource.

In one exemplary embodiment, a user may connect the cellphone to the client computer. The client computer is installed with an application, e.g., named "cell phone assistant,") for managing cell phone, so that the user may manage the cell phone using the application. Meanwhile, the user may access websites which provide all sorts of cell phone resources using the application. The user may browse resources displayed on websites, select a resource to be processed by the mobile phone, and issue an instruction of processing the selected resource to the application. The application then sends a request for processing the resource to the server based on the user instruction.

Suppose that the user plans to download a picture from a website, and use the downloaded picture as a desktop wallpaper of the cell phone. The user may browse pictures displayed on webpages of websites to search for a favorite picture. If the user finds a favorite picture, the user may select the picture and click on an icon, e.g., named "set downloaded picture as desktop wallpaper of cellphone immediately," below the picture, so as to trigger a desktop wallpaper setting request. The desktop wallpaper setting request may include an ID of the selected picture and a processing manner of the picture, i.e., setting the picture as the cell phone wallpaper in the illustrated embodiment.

In step 502, the server may obtain an ID of an interface, such as an application program interface (API), of a mobile terminal APP to process the resource and a storage address of the resource corresponding to the ID of the resource.

For example, after receiving the request for processing the resource sent from the client computer, the server may obtain, from a preset corresponding relationship between IDs of interfaces of cell phone APPs and processing manners of resources, an ID of an interface of a cell phone APP used to process the resource corresponding to the processing manner of the resource, and obtain, from a preset corresponding relationship between IDs of resources and storage addresses, a storage address of the resource corresponding to the ID of the resource.

In the above illustrated embodiment, the request for processing a resource received by the server is the request of setting a desktop wallpaper. From a preset corresponding relationship between IDs of resources and storage addresses, the server obtains the storage address corresponding to the ID of the picture carried in the request of setting a desktop wallpaper. The picture is stored at the storage address. Meanwhile, from a preset corresponding relationship between IDs of interfaces of cell phone APPs and processing manners of resources, the server obtains the ID of the interface of a cell phone APP corresponding to the processing manner of the picture carried in the request of setting desktop wallpaper, i.e., the ID of the interface of the cell phone APP which can set a picture as a desktop wallpaper.

In another embodiment, the request for processing a resource received by the server is a request of installing a specified APP, which carries an ID of the specified APP and a processing manner of the specified APP, i.e., installing the specified APP. From a preset corresponding relationship between IDs of resources and storage addresses, the server obtains the storage address corresponding to the ID of the specified APP. For example, an Android package of the APP is stored at the storage address. Meanwhile, from a preset corresponding relationship between IDs of interfaces of cell phone APPs and processing manners of resources, the server obtains the ID of the interface of a cell phone APP corresponding to the processing manner of the specified APP, i.e., the ID of the interface of installing the specified APP.

In exemplary embodiments, a corresponding relationship between IDs of interfaces of cell phone APPs and processing manners of resources can be established in advance. In addition, the ID of an interface of a cell phone APP is used to uniquely identify the interface of the cell phone APP. That is, IDs of different interfaces of a cell phone APP are different from each other. For example, an APP setting a wallpaper may include an interface of setting a desktop wallpaper and an interface of setting a lock screen wallpaper. Besides, different cellphones may have different IDs for a same interface.

In one exemplary embodiment, step 502 may further include the server obtaining, from a preset corresponding relationship between IDs of interfaces of cell phone APPs and processing manners of resources, an ID of a cell phone APP corresponding to the resource, and sending the obtained ID of the cell phone APP corresponding to the resource to the client computer.

In step 503, the server may generate a first instruction, and send the storage address of the resource and the first instruction to the client computer. The first instruction may include the ID of the interface of the cell phone APP used to process the resource, and the first instruction is used for instructing the cell phone to call the interface of the cell phone APP to process the resource.

In the above illustrated embodiment, after obtaining the storage address of the picture and the ID of the interface of the APP of setting a picture as a desktop wallpaper, the server may generate the first instruction including the ID of the interface of the APP of setting a picture as a desktop wallpaper, and then send the storage address of the picture and the first instruction to the client computer.

In step 504, the client computer receives the ID of the cell phone APP corresponding to the resource sent from the server, and detects whether the cell phone is installed with the cell phone APP.

If it is detected that the cell phone APP is installed in the cell phone, step 505 is performed; otherwise, the method 500 ends.

In one exemplary embodiment, after receiving the ID of the cell phone APP corresponding to the resource sent from the server, the client computer may scan IDs of all APPs installed in the cell phone, to determine whether the cell phone APP corresponding to the resource is present.

In step 505, the client computer may download the resource from the storage address of the resource, and then send the downloaded resource and the first instruction to the cell phone.

For example, if it is detected that the APP of setting a picture as a desktop wallpaper is installed in the cell phone, the client computer downloads the picture from the storage address of the picture, and then sends the downloaded picture and the first instruction to the cell phone.

In step 506, the cell phone receives the resource and the first instruction sent from the client computer, and then calls the interface of the APP to process the resource by following the first instruction.

For example, after receiving the downloaded picture and the first instruction sent from the client computer, the cell phone may call the interface of the APP of setting a picture as a desktop wallpaper, so as to set the downloaded picture as a desktop wallpaper.

In step 507, the server may generate a second instruction and send the second instruction to the client computer. For example, the second instruction may include the ID of the interface of the cell phone APP and the ID of the resource, and is used for instructing the cell phone to call the interface of the cellphone APP to return a processed result of the resource. The processed result of the resource can indicate whether the cell phone has processed the resource.

In some embodiments, step 507 and step 503 can be performed simultaneously. The server may generate the second instruction while sending the first instruction to the client computer (step 503).

In one exemplary embodiment, the server packages the storage address of the picture, the first instruction, and the second instruction into a piece of command, and sends the command to the client computer. For example, the command can be in the following format:

callService("setWallpaper",setWallPaperCallback(result){ }, "http://example.com/mountain.jpg"), where "setWallpaper" indicates the ID of the interface of the APP for setting a desktop wallpaper, "http://example.com/mountain.jpg" indicates the storage address of the picture, and "callService" indicates calling the interface "Wallpaper" to process the picture, "setWallPaperCallback(result){ }" indicates calling the interface "setWallpaper" to return the processed result of the picture. The "setWallPaperCallback" may be a callback function.

In step 508, the client computer may receive the second instruction sent from the server and send the second instruction to the cell phone, and then sends the processed result of the resource returned from the cell phone to the server.

For example, the cell phone returns the processed result of the resource to the client computer by following the second instruction sent from the client computer. The client computer sends the processed result of the resource to the server after receiving the processed result of the resource.

Figure 6:
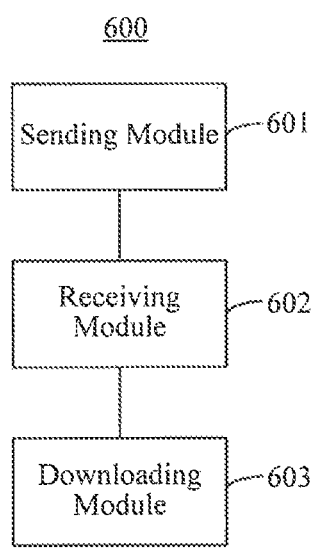
FIG. 6 is a block diagram of a device for processing a mobile terminal resource, according to an exemplary embodiment.

FIG. 6 is a block diagram of a device 600 for processing a mobile terminal resource, according to an exemplary embodiment. For example, the device 600 may be provided as the client computer 11 (FIG. 1). Referring to FIG. 6, the device 600 includes a sending module 601, a receiving module 602, and a downloading module 603.

The sending module 601 is configured to send a request for processing a resource to a server. The request for processing the resource includes an ID of the resource and a processing manner of the resource.

The receiving module 602 is configured to receive a storage address of the resource and a first instruction returned from the server. The first instruction includes an ID of an interface, such as an application program interface (API), of a mobile terminal APP to process the resource, and is used for instructing a mobile terminal to call the interface of the mobile terminal APP to process the resource.

The downloading module 603 is configured to download the resource from the storage address of the resource, and send the downloaded resource and the first instruction to the mobile terminal, so as to enable the mobile terminal to call the interface of the mobile terminal APP to process the resource.

In one exemplary embodiment, the downloading module 603 is configured to scan IDs of all mobile terminal APPs installed in the mobile terminal, and detect whether the mobile terminal APP is installed in the mobile terminal using the ID of the mobile terminal APP sent from the server. If it is detected that the mobile terminal APP is installed in the mobile terminal, the downloading module 603 downloads the resource from the storage address of the resource, and sends the downloaded resource and the first instruction to the mobile terminal so as to enable the mobile terminal to call the interface of the mobile terminal APP to process the resource.

In one exemplary embodiment, the receiving module 602 is further configured to receive a second instruction sent from the server, which may include the ID of the interface of the mobile terminal APP and the ID of the resource and is used for instructing the mobile terminal to call the interface of the mobile terminal APP to return a processed result of the resource. The receiving module 602 is also configured to send the second instruction to the mobile terminal, and send the processed result of the resource returned from the mobile terminal to the server.

Figure 7:
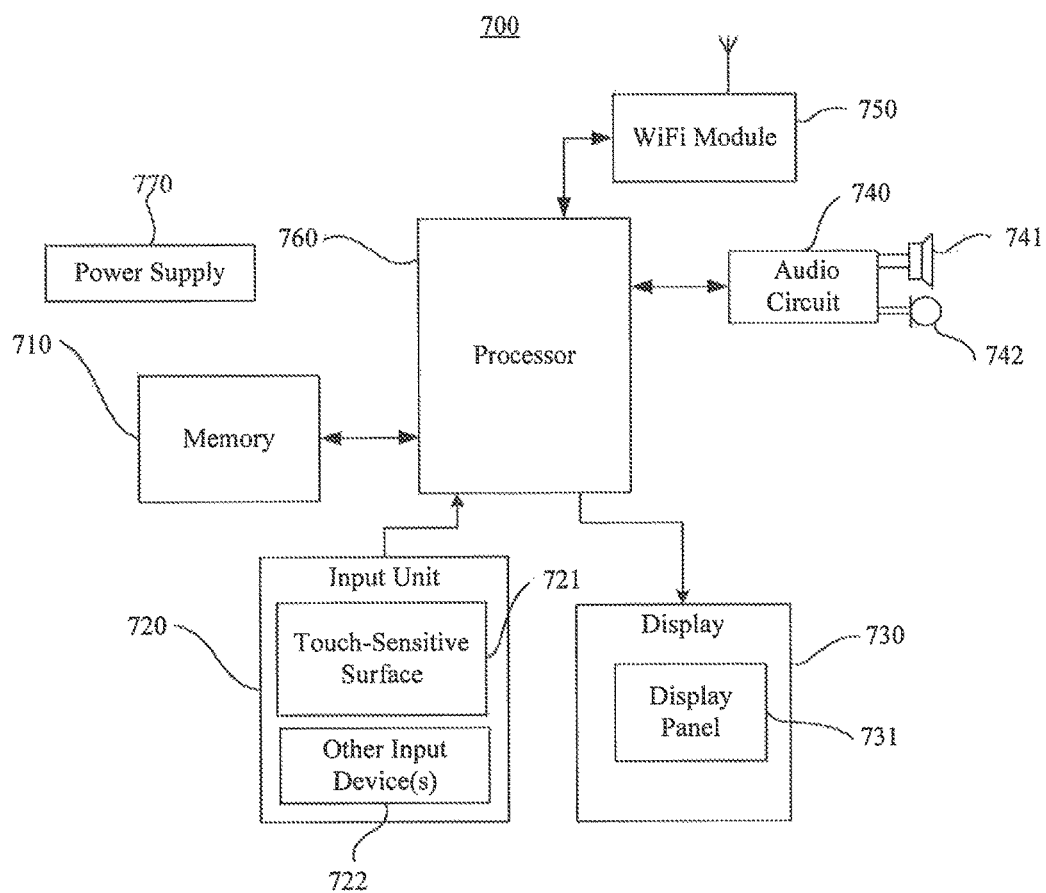
FIG. 7 is a block diagram of a client computer, according to an exemplary embodiment.

FIG. 7 is a block diagram of a client computer 700, according to an exemplary embodiment. For example, the client computer 700 may be the client computer 11 (FIG. 1), and may be used for implementing the above described methods.

Referring to FIG. 7, the client computer 700 may include one or more of a memory 710, an input unit 720, a display 730, an audio circuit 740, a wireless fidelity (Wi-Fi) module 750, a processor 760 including one or more process cores, and a power supply 770. Those skilled of the art will understand that the structure of the client computer 700 is not restricted to that shown in FIG. 7, and the client computer 700 may include more or less components than those in FIG. 7, or a combination of some components, or have different component arrangements.

The memory 710 is configured to store software programs and modules, which allow various types of functional applications and data processes to be performed when executed by the processor 760. The memory 710 may mainly include a program storage area and a data storage area. The program storage area may store an operation system, applications required by at least one required functions (such as voice play function, image play function and the like). The data storage area may store data (such as video data, phonebook data and the like) generated by the client computer 700. In addition, the memory 710 may include a high speed random access memory, or further include a non-volatile memory, such as at least a magnetic disk storage device, a flash memory, or other non-volatile solid-state storage devices. Correspondingly, the memory 710 may further include a memory controller to provide access from the processor 760 and the input unit 720 to the memory 710.

The input unit 720 is configured to receive input numerical or character information and generate signal inputs of a keypad, a mouse, a joystick, an optical device, or a trackball related to user settings and function control. The input unit 720 may include a touch sensitive surface 721 and one or more other input devices 722. The touch sensitive surface 721, also known as a touch display screen or a touchpad, may collect touch operations on or near it by the user (for example the user operations on or near the touch sensitive surface 721 with any kind of suitable objects or attachments such as the finger, touch pen, and the like), and drive a corresponding connected device according to a preset program. For example, the touch sensitive surface 721 may include first and second parts, i.e., a touch detection device and a touch controller. The touch detection device may detect a touch operation of the user, and detect the signal caused by the touch operation, and then transmit the signal to the touch controller. The touch controller may receive touch information from the touch detection device, convert it into coordinates of touch points to send to the processor 760, and can receive the command sent from the processor 760 to execute it. The touch sensitive surface 721 may be realized in various types, such as a resistive type, a capacitive type, an infrared type, a surface acoustic wave type, and the like. Besides the touch sensitive surface 721, the input unit 720 may further include one or more other input devices 722. The other input devices 722 may include, without limitation, one or more of a physical keypad, functional buttons (such as volume control buttons, switch buttons and the like), a trackball, a mouse, a joystick, and the like.

The display 730 is configured to display various kinds of graphic user interfaces of information input by the user or provided to the user or the client computer 700. These graphic user interfaces may be made up of graphics, texts, icons, videos and any other combination thereof. The display 730 may include a display panel 731, such as a liquid crystal display (LCD), an organic light-emitting diode (OLED) or the like. Further, the touch sensitive surface 721 may be configured to cover the display panel 731. When detecting a touch operation on or near the touch sensitive surface 721, the touch sensitive surface 721 may send signals to the processor 760 to determine a type of the touch operation. Thereafter, the processor 760 may provide a corresponding visual output on the display panel 731 according to the type of the touch operation. Although in FIG. 7 the touch sensitive surface 721 and the display panel 731 are two independent components for realizing input and output functions, they can be integrated together in some embodiments to realize input and output functions.

The audio circuit 740 is coupled to a speaker 741 and a microphone and may provide an audio interface between the user and the client computer 700. The audio circuit 740 may transmit an electrical signal converted from received audio data to the loudspeaker 741 to be converted into a voice signal output. On the other hand, the microphone 742 converts collected voice signals into electrical signals, and the audio circuit 740 receives the electrical signals and then converts them into audio data, then outputs the audio data to the processor 760 to be processed and transmitted to, for example, another client computer, or outputs the audio data to the memory 720 to be further processed. The audio circuit 740 may further include an earplug jack to provide communication between an external earphone and the client computer 700.

The WiFi module 750 provides the user with wireless broadband internet access, which allows the user to transmit or receive E-mails, browse web pages and access streaming media and the like. Although the WiFi module 750 is shown in FIG. 7, it should be understood that the WiFi module 750 may not be a necessary component of the client computer 700, and may be omitted according to requirements.

The processor 760 is a control center of the client computer 700, using various interfaces and wires to connect respective portions of the whole client computer. By running or executing software programs and/or modules stored in the memory 710, calling data stored in the memory 710, and executing various functions of the client computer 700 and processing data, the processor 760 handles overall monitoring of the client computer 700. The processor 760 may include one or more processing cores, and may integrate an application processor and a modem processor. The application processor may mainly process an operation system, user interfaces, application programs and the like, and the modem processor may mainly process wireless communications. In some embodiments, the modem processor may not be integrated into the processor 760.

The power supply 770 is configured to supply power to components of the client computer 700. The power supply 770 may be logically connected with the processor 760 through a power supply management system, thereby realizing functions of managing charging, discharging, power consumption and the like through the power supply management system. The power supply 770 may further include one or more of a direct current (DC) power supply or an alternating current (AC) power supply, a rechargeable system, a power supply malfunction detection circuit, a power supply converter or an inverter, a power supply state indicator and the like.

In exemplary embodiments, there is also provided a non-transitory computer-readable storage medium including instructions, such as included in the memory 710, executable by the processor 760 in the client computer 700, for performing the method 100 (FIG. 1).

Figure 8:
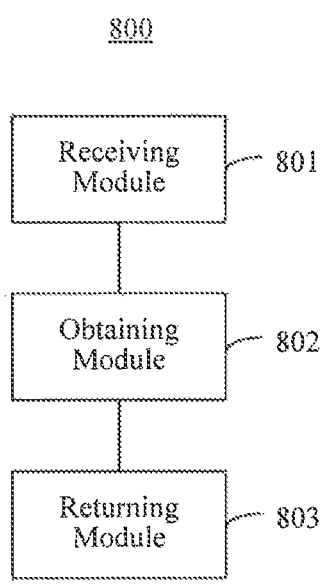
FIG. 8 is a block diagram of a device for processing a mobile terminal resource, according to an exemplary embodiment.

FIG. 8 is a block diagram of a device 800 for processing a mobile terminal resource, according to an exemplary embodiment. For example, the device 800 may be provided as the server 10 (FIG. 1). Referring to FIG. 8, the device 800 includes a receiving module 801, an obtaining module 802, and a returning module 803.

The receiving module 801 is configured to receive a request for processing a resource sent from a client computer, the request for processing the resource including an ID of the resource and a processing manner of the resource.

The obtaining module 802 is configured to obtain, from a preset corresponding relationship between IDs of interfaces of mobile terminal APPs and processing manners of resources, an ID of an interface of a mobile terminal APP used to process the resource corresponding to the process manner of the resource, and obtain, from a preset corresponding relationship between IDs of resources and storage addresses, a storage address of the resource corresponding to the ID of the resource.

The returning module 803 is configured to generate a first instruction and return the storage address of the resource and the first instruction to a client computer, the first instruction including the ID of the interface of the mobile terminal APP, and being configured to instruct a mobile terminal to call the interface of the mobile terminal APP to process the resource.

The returning module 803 may be further configured to generate a second instruction and send the second instruction to the client computer, the second instruction including the ID of the interface of the mobile terminal APP and the ID of the resource, and being configured to instruct the mobile terminal to call the interface of the mobile terminal APP to return a processed result of the resource.

Figure 9:
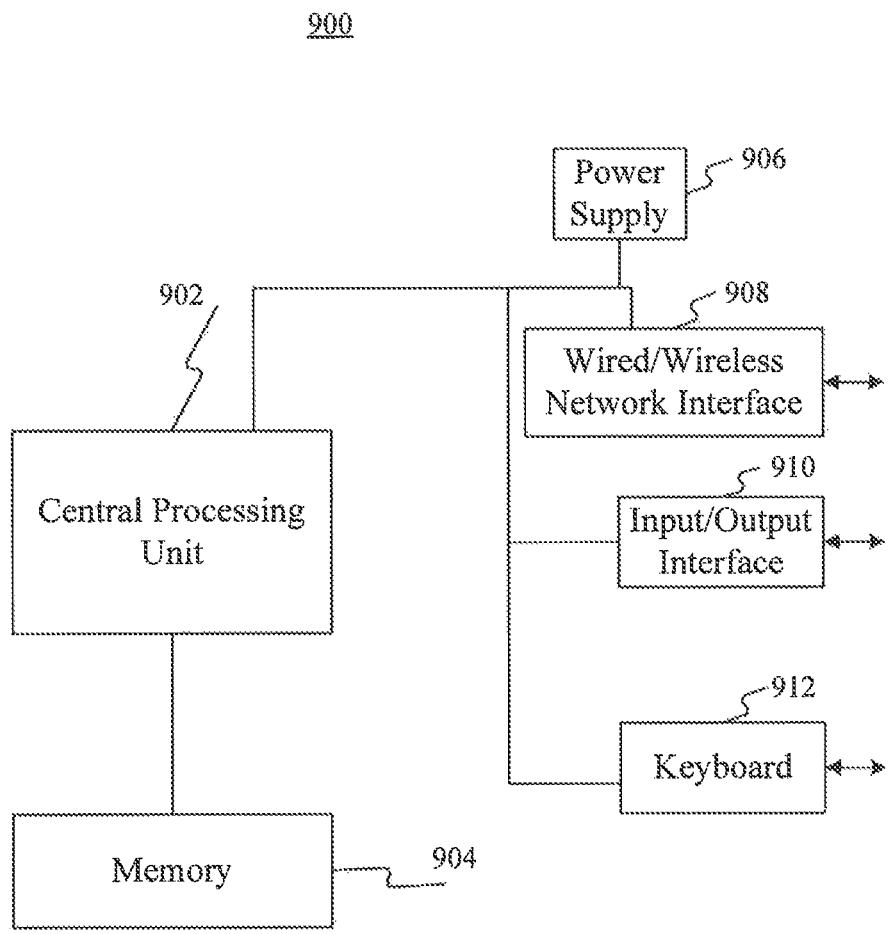
FIG. 9 is a block diagram of a server, according to an exemplary embodiment.

FIG. 9 is a block diagram of a server 900, according to an exemplary embodiment. For example, the server 900 may be the server 11 (FIG. 1), and may be used for implementing the above-described methods.

Referring to FIG. 9, the server 900 may include a central processing unit (CPU) 902 including one or more processors and memory resources, represented by a memory 904, for storing instructions executable by the CPU 902, such as application programs. The application programs stored in memory 904 may include one or more modules each corresponding to a set of instructions. Further, the CPU 902 is configured to execute the instructions to perform the method 300 (FIG. 3).

The server 900 may also include a power supply 906 configured to perform power management of the server 900, one or more wired or wireless network interfaces 908 configured to connect the server 900 to a network, one or more input-output interfaces 910, one or more keyboards 912, etc. The server 900 may operate based on one or more operating systems stored in the memory 904, such as Windows Server, Mac OS, Unix, Linux, FreeBSD and the like.

In exemplary embodiments, there is also provided a non-transitory computer-readable storage medium including instructions, such as included in the memory 904, executable by the processor 902 in the server 900, for performing the method 300 (FIG. 3).

Figure 10:
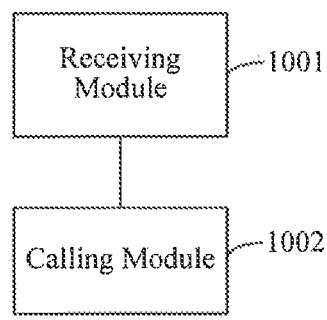
FIG. 10 is a block diagram of a device for processing a mobile terminal resource, according to an exemplary embodiment.

FIG. 10 is a block diagram of a device 1000 for processing a mobile terminal resource, according to an exemplary embodiment. For example, the device 1000 may be the mobile terminal 12 (FIG. 1). Referring to FIG. 10, the device 1000 may include a receiving module 1001 and a calling module 1002.

The receiving module 1001 is configured to receive a resource and a first instruction downloaded from a client computer, the first instruction including an ID of an interface of a mobile terminal APP, and being configured to instruct the mobile terminal to call the interface of the mobile terminal APP to process the resource.

The calling module 1002 is configured to call the interface of the mobile terminal APP to process the resource by following the first instruction.

In one exemplary embodiment, the receiving module 1001 is configured to receive a second instruction sent from the client computer, the second instruction including the ID of the interface of the mobile terminal APP and the ID of the resource, and being configured to instruct the mobile terminal to call the interface of the mobile terminal APP to return a processed result of the resource. The calling module 1002 is further configured to call the interface of the mobile terminal APP to return the processed result of the resource, and send the processed result of the resource to the client computer by following the second instruction.

Figure 11:
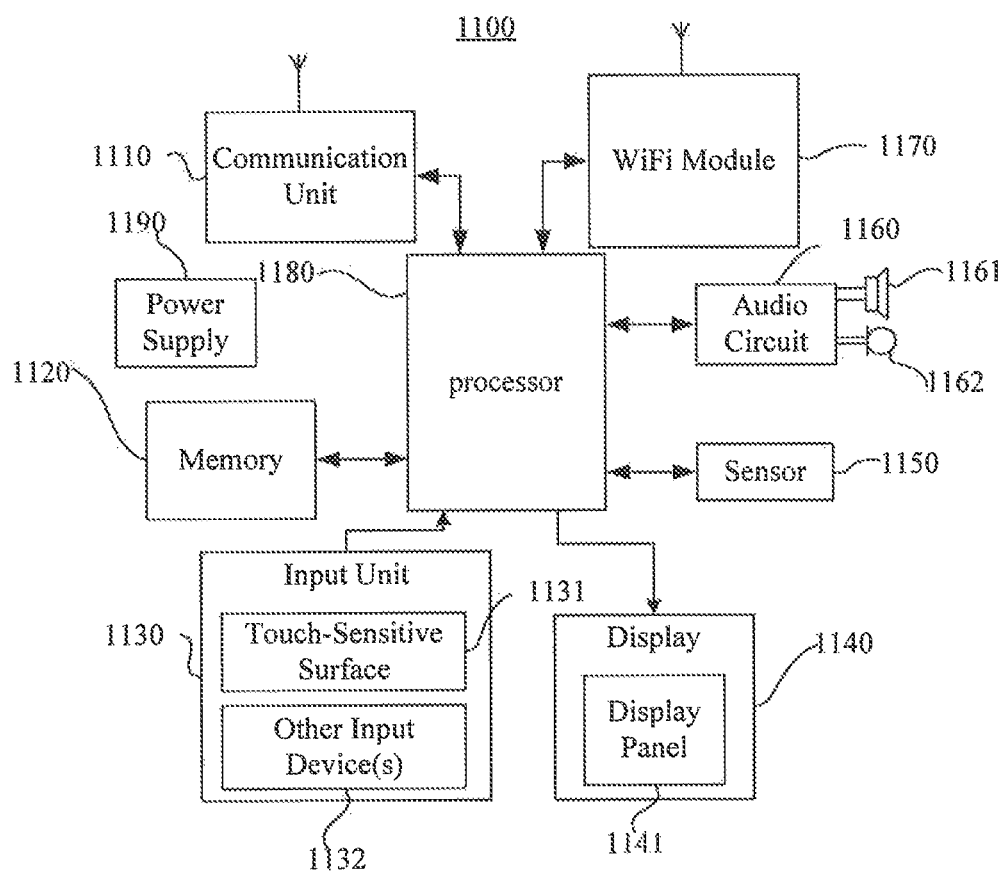
FIG. 11 is a block diagram of a mobile terminal, according to an exemplary embodiment.

FIG. 11 is a block diagram of a mobile terminal 1100, according to an exemplary embodiment. For example, the mobile terminal 1100 may be the mobile terminal 12 (FIG. 1), and may be used for implementing the above described methods.

Referring to FIG. 11, the mobile terminal 1100 may include one or more of a communication unit 1110, memory resources represented by a memory 1120, an input unit 1130, a display 1140, a sensor 1150, an audio circuit 1160, a WiFi module 1170, a processor 1180 including one or more processing cores, and a power source 1190. One of ordinary skill in the art will understand that the structure of the mobile terminal 1100 is not restricted to that shown in FIG. 11, and the mobile terminal 1100 may include more or less components than those in FIG. 11, or a combination of some components, or have different component arrangements.

The communication unit 1110 is configured to send and receive signals during sending and receiving information or in a process of phone calling. The communication unit 1110 may be a network communication device such as a radio frequency (RF) circuit, a router, a modem and the like. For example, if the communication unit 1110 is the RF circuit, the communication unit 1110 receives downlink information from a base station and then transmits the downlink information to the processor 1180 to be processed, and transmits related uplink data to the base station. Generally, the RF circuit as the communication unit 1100 includes, but is not limited to, an antenna, at least one amplifier, a tuner, one or more oscillators, a subscriber identity module (SIM) card, a transceiver, a coupler, a low noise amplifier (LNA), a duplexer and the like. Additionally, the communication unit 1110 may also communicate with a network or other devices via a wireless network. The wireless network may adopt any one of communication standard or protocol including, but not limited to, global system of mobile communication (GSM), general packet radio service (GPRS), code division multiple access (CDMA), wideband code division multiple access (WCDMA), long term evolution (LTE), email, short messaging service (SMS) and the like.

The memory 1120 may be configured to store software programs and modules, which allow various types of functional applications and data processes to be performed when executed by the processor 1180. The memory 1120 may mainly include a program storage area and a data storage area. The program storage area may store an operating system, applications required by at least one function (such as a voice play function, an image play function and the like). The data storage area may store data (such as video data, phonebook data, and the like) created by the use of the mobile terminal 1100. In addition, the memory 1120 may include a high speed random access memory. The memory 1120 may also include a nonvolatile memory (NVM), such as at least a magnetic disk storage device, flash memory, or other nonvolatile solid-state storage devices. Correspondingly, the memory 1120 may also include a memory controller to control access to the memory 1120 performed by the processor 1180 and the input unit 1130.

The input unit 1130 is configured to receive input numerical or character information and generate signal inputs of a keypad, a mouse, a joystick, an optical device, or a trackball related to user settings and function control. The input unit 1130 may include a touch sensitive surface 1131 and one or more other input devices 1132. The touch sensitive surface 1131, also known as a touch display screen or a track pad, may collect a touch operation on or near it by a user (for example, the user operations on or near the touch sensitive surface 1131 with any kind of suitable objects or attachments such as a finger, a touch pen, and the like), and drive a corresponding connected device according to a preset program. For example, the touch sensitive surface 1131 may include first and second parts, i.e., a touch detecting device and a touch controller. The touch detecting device may detect the touch orientation of the user, and detect a signal caused by the touch operation, and then transmit the signal to the touch controller. The touch controller may receive the touch information from the touch detecting device and convert it into touch point coordinates and then transmit the coordinates to the processor 1180. The touch controller also receives and performs instructions from the processor 1180. Additionally, the touch sensitive surface 1131 may be realized in various types, such as a resistive type, a capacitive type, an infrared type, or a surface acoustic wave type. The input unit 1130 may also include one or more other input device(s) 1132. For example, the other input devices 1132 may include, without limitation, one or more of a physical keypad, functional buttons (such as volume control button, switch button and the like), a trackball, a mouse, a joystick, and the like.

The display 1140 is configured to display various graphic user interfaces and information input by the user or provided to the user. These graphic user interfaces may be made up of graphics, texts, icons, videos, and any combination thereof. The display 1140 may include a display panel 1141, such as a liquid crystal display (LCD), an organic light-emitting diode (OLED) or the like. Furthermore, the touch sensitive surface 1131 may be configured to cover the display panel 1141. When detecting the touch operation performed on or near the touch sensitive surface 1131, the touch sensitive surface 1131 may transmit signals to the processor 1180 to determine a type of the touch operation, and the processor 1180 may provide a corresponding visual output on the display panel 1141 according to the type of the touch operation. Although in FIG. 11 the touch sensitive surface 1131 and the display panel 1141 realize input and output functions as two independent components, they can be integrated together in some embodiment to realize input and output functions.

The sensor 1150 may be a photo sensor, a motion sensor, or any other sensors. For example, the photo sensor may include an ambient light sensor and a proximity sensor. The ambient light sensor may adjust a brightness of the display panel 1141 according to intensity of the ambient light. The proximity sensor may close the display panel 1141 and/or backlight when the mobile terminal 1100 is close to the user's ear. As an example of the motion sensor, a gravitational acceleration sensor may detect values of accelerations in various directions (such as along three axes). and detect a value and a direction of the gravitation when in a stationary state. The gravitational acceleration sensor may be used in an application for identifying a mobile phone attitude (such as switching between a landscape mode and a vertical mode, corresponding games, attitude adjusting with a magnetometer), functions related to vibration (such as a pedometer, a knocking) and the like. Other sensors which may be arranged in the mobile terminal 1100 include, e.g., a gyroscope, a barometer, a humid meter, a thermometer, an infrared sensor and the like.

The audio circuit 1160 is coupled to a speaker 1161 and a microphone 1162, and may provide an audio interface between the user and the mobile terminal 1100. The audio circuit 1160 may convert received audio data into electronic signals and transmit the electronic signals to the speaker 1161, and the speaker 1161 may convert the electronic signals into voice signals and output the voice signals. Additionally, the microphone 1162 may convert collected voice signals into electronic signals. and the audio circuit 1160 receives the electronic signals and converts them into audio data. The audio data is transmitted to the processor 1180 and then is transmitted to another terminal via the RE circuit as the communication unit 1110 after being processed by the processor 1180, or the audio data is transmitted to the memory 1120 to be further processed. The audio circuit 1160 may also include an earplug jack to allow communication between a peripheral earphone and the mobile terminal 1100.

The WiFi module 1170 provides wireless broadband internet access, which allows the user to send or receive E-mails, browse web pages, and access streaming media and the like. Although the WiFi module 1170 is shown in FIG. 11, it should be understood that the WiFi module 1170 is not a necessary component of the mobile terminal 1100, and may be omitted according to requirements The processor 1180 is a control center of the mobile terminal 1100 using various interfaces and wires to connect respective portions of the whole mobile terminal. By running or executing software programs and/or modules stored in the memory 1120, calling data stored in the memory 1120, and executing various functions of the mobile terminal 1100 and processing data, the processor 1180 handles overall monitoring of the mobile terminal 1100. The processor 1180 may include one or more processing cores, and may integrate an application processor and a modem processor. The application processor may mainly process the operation system, user interfaces, application programs and the like, and the modem processor may mainly process wireless communications. In some embodiments, the modem processor may not be integrated into the processor 1180.

The power supply 1190 is configured to supply power to components of the mobile terminal 1100. The power supply 1190 may be logically connected with the processor 1180 through a power supply management system, thereby realizing functions of managing charging, discharging, power consumption, and the like through the power supply management system. The power supply 1190 may further include one or more of direct current (DC) or alternating current (AC) power supplies, a rechargeable system, a power supply malfunction detection circuit, a power supply converter or an inverter, a power supply state indicator and the like.

Although not shown, the mobile terminal 1100 may also include a camera, a Bluetooth module.

In exemplary embodiments, there is also provided a non-transitory computer-readable storage medium including instructions, such as included in the memory 1120, executable by the processor 1180 in the mobile terminal 1100, for performing the method 400 (FIG. 4).

The computer-readable storage medium in the present disclosure may be a volatile memory or a nonvolatile memory, or may a combination thereof. As an example without limitation, the nonvolatile memory may include a read-only memory (ROM), a programmable ROM (PROM), an electrically programmable read-only memory ROM (EPROM), an electrically erasable programmable ROM (EEPROM) or a flash memory. The volatile memory may include a random access memory (RAM), which may function as an external cache memory. As an example without limitation, the RAM may be obtained in various kinds such as a synchronous RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a directly Rambus RAM (DRRAM).

Various exemplary logic blocks, modules and circuits described in conjunction with the disclosure may be implemented or performed by the following components that are designed to perform the above methods: a general-purpose processor, a digital signal processor (DSP), an application-specific integrated circuit (ASIC), a field programmable gate array (FPGA) or other programmable logic devices, a discrete gate or transistor logic, a discrete hardware assemble or any combination of those components. The general-purpose processor may be a microprocessor, or any of a traditional processor, a controller, a microcontroller, or a state machine. The processor may also be implemented by a combination of the computing devices such as a combination of a DSP and a microprocessor, a plurality of microprocessors, one or more microprocessors in conjunction with a DSP core, or any other configurations.

One of ordinary skill in the art will understand that the above described modules can each be implemented by hardware, or software, a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for processing a resource for use in a client computer, comprising the following steps performed by the client computer:
   sending, to a server, a request for processing the resource based on a user instruction, the request for processing the resource including an identification (ID) of the resource and a processing manner of the resource;
   receiving, from the server, a storage address of the resource and a first instruction, the first instruction including an ID of an interface of a mobile terminal application, and being configured to instruct a mobile terminal to call the interface of the mobile terminal application to process the resource, wherein the ID of the interface of the mobile terminal application is based on a preset relationship between IDs of interfaces of mobile terminal applications and processing manners of resources;
   detecting whether the mobile terminal application is installed on the mobile terminal;
   if it is detected that the mobile terminal application is installed on the mobile terminal, downloading the resource from the storage address of the resource, and sending the downloaded resource and the first instruction to the mobile terminal, wherein the downloaded resource and the first instruction configure the mobile terminal to call the interface of the mobile terminal application to process the resource;
   receiving a second instruction sent from the server, the second instruction including the ID of the interface of the mobile terminal application and the ID of the resource, and being configured to instruct the mobile terminal to call the interface of the mobile terminal application to return a processing result of the resource; and
   sending the second instruction to the mobile terminal, and sending the processing result of the resource returned from the mobile terminal to the server.

2. The method of claim 1, wherein the detecting whether the mobile terminal application is installed on the mobile terminal comprises:
   scanning IDs of all mobile terminal applications installed in the mobile terminal;
   detecting whether the mobile terminal application is installed in the mobile terminal, based on an ID of the mobile terminal application sent from the server.

3. The method of claim 1, wherein the receiving of the first instruction comprises:
   receiving the first instruction, the first instruction including an ID of an application program interface (API) of the mobile terminal application.

4. A method for processing a resource for use in a mobile terminal, comprising the following steps performed by the mobile terminal:
   receiving, from a client computer, the resource and a first instruction, the first instruction including an identification (ID) of an interface of a mobile terminal application, wherein the mobile terminal application is installed on the mobile terminal, and the first instruction is configured to instruct the mobile terminal to call the interface of the mobile terminal application to process the resource, and wherein the ID of the interface of the mobile terminal application is based on a preset relationship between IDs of interfaces of mobile terminal applications and processing manners of resources;
   calling the interface of the mobile terminal application to process the resource by following the first instruction;
   receiving, from the client computer, a second instruction, the second instruction including the ID of the interface of the mobile terminal application and an ID of the resource, and being configured to instruct the mobile terminal to call the interface of the mobile terminal application to return a processing result of the resource; and
   calling the interface of the mobile terminal application to return the processing result of the resource, and sending the processing result of the resource to the client computer by following the second instruction.

5. The method of claim 4, wherein the receiving of the first instruction comprises:
   receiving the first instruction, the first instruction including an ID of an application program interface (API) of the mobile terminal application.

6. A client computer, comprising:
   a processor; and
   a memory for storing instructions executable by the processor;
   wherein the processor is configured to:
   send, to a server, a request for processing a resource based on a user instruction, the request for processing the resource including an identification (ID) of the resource and a processing manner of the resource;
   receive, from the server, a storage address of the resource and a first instruction, the first instruction including an ID of an interface of a mobile terminal application, and being configured to instruct a mobile terminal to call the interface of the mobile terminal application to process the resource, wherein the ID of the interface of the mobile terminal application is based on a preset relationship between IDs of interfaces of mobile terminal applications and processing manners of resources;

detect whether the mobile terminal application is installed on the mobile terminal;

if it is detected that the mobile terminal application is installed on the mobile terminal, download the resource from the storage address of the resource, and send the downloaded resource and the first instruction to the mobile terminal, wherein the downloaded resource and the first instruction configure the mobile terminal to call the interface of the mobile terminal application to process the resources;

receive a second instruction sent from the server, the second instruction including the ID of the interface of the mobile terminal application and the ID of the resource, and being configured to instruct the mobile terminal to call the interface of the mobile terminal application to return a processing result of the resource; and send the second instruction to the mobile terminal, and send the processing result of the resource returned from the mobile terminal to the server.

7. The client computer of claim 6, wherein the processor is further configured to:

scan IDs of all mobile terminal applications installed in the mobile terminal;

detect whether the mobile terminal application is installed in the mobile terminal, based on an ID of the mobile terminal application sent from the server.

8. The client computer of claim 6, wherein the processor is further configured to:

receive the first instruction, the first instruction including an ID of an application program interface (API) of the mobile terminal application.

9. A mobile terminal, comprising:

a processor; and a memory for storing instructions executable by the processor;

wherein the processor is configured to:

receive, from a client computer, a resource and a first instruction, the first instruction including an identification (ID) of an interface of a mobile terminal application, wherein the mobile terminal application is installed on the mobile terminal, and is configured to instruct the mobile terminal to call the interface of the mobile terminal application to process the resource, wherein the ID of the interface of the mobile terminal application is based on a preset relationship between IDs of interfaces of mobile terminal applications and processing manners of resources;

call the interface of the mobile terminal application to process the resource by following the first instruction;

receive, from the client computer, a second instruction, the second instruction including the ID of the interface of the mobile terminal application and an ID of the resource, and being configured to instruct the mobile terminal to call the interface of the mobile terminal application to return a processing result of the resource; and call the interface of the mobile terminal application to return the processing result of the resource, and send the processing result of the resource to the client computer by following the second instruction.

10. The mobile terminal of claim 9, wherein the processor is further configured to:

receive the first instruction, the first instruction including an ID of an application program interface (API) of the mobile terminal application.

* * * * *